United States Patent [19]

Hoult

[11] Patent Number: 5,056,886
[45] Date of Patent: Oct. 15, 1991

[54] OPTICAL SWITCHING DEVICE

[75] Inventor: Robert A. Hoult, Bethel, Conn.

[73] Assignee: Perkin-Elmer Corporation, Norwalk, Conn.

[21] Appl. No.: 603,592

[22] Filed: Oct. 25, 1990

[51] Int. Cl.$^5$ .............................................. G02B 6/32
[52] U.S. Cl. ...................................... 385/20; 385/18; 385/33
[58] Field of Search ........................... 350/96.15, 96.18

[56] References Cited

U.S. PATENT DOCUMENTS

| | | | |
|---|---|---|---|
| 4,013,342 | 3/1977 | Narodny | 350/96.18 X |
| 4,261,638 | 4/1981 | Wagner | 350/96.15 |
| 4,304,460 | 12/1981 | Tanaka et al. | 350/96.18 X |
| 4,381,881 | 5/1983 | Bell | 350/96.16 |
| 4,403,861 | 9/1983 | Boisde et al. | 356/407 |
| 4,484,793 | 11/1984 | Laude | 350/96.15 X |
| 4,594,002 | 6/1986 | McNally | 356/346 |
| 4,938,555 | 7/1990 | Savage | 350/96.15 |

Primary Examiner—John D. Lee
Assistant Examiner—Stephen W. Barns
Attorney, Agent, or Firm—H. S. Ingham; E. T. Grimes

[57] ABSTRACT

An optical switching device includes a first optical fiber terminating in a first window, and a plurality of second optical fibers each terminating in a corresponding second window. A concave mirror is selectively positionable with conjugate foci located respectively at the first window and selectively at any one of the second windows so as to reciprocally image the first window and a selected second window on each other. The imaging mirror is rotated about an axis spaced from and parallel to the optical axis of the mirror, so as to rotate the mirror among a plurality of arcuately spaced selected positions. In each selected position the imaging means closes a light circuit between the first optical fiber and a selected second optical fiber.

6 Claims, 2 Drawing Sheets

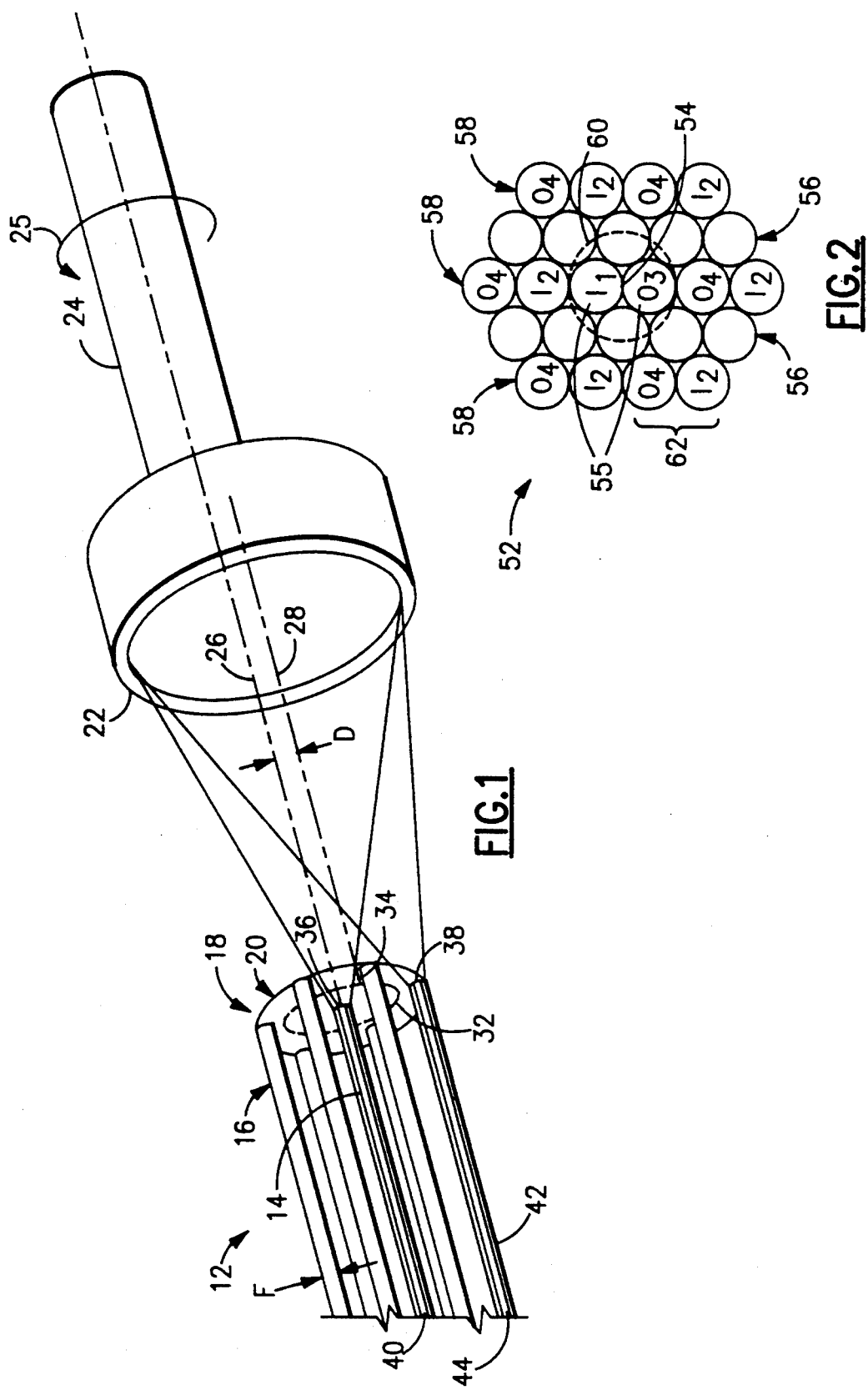

OPTICAL SWITCHING DEVICE

This invention relates to light transmission such as by optical fibers, and particularly to switching of light beams in an optical transmission network

BACKGROUND OF THE INVENTION

With the advent of fiber optics, the use of optical fibers to transmit information has become widespread. Generally, such as for telephone lines, switching for the routing of optical information is effected electronically before converting the information from electrical to optical.

For example U.S. Pat. No. 4,381,881 (Bell) teaches a switching system for converting fiber optic signals to electrical signals and back into optical signals again, in order to reroute the involves detecting light radiation in portions of bundles of optical fibers.

U.S. Pat. No. 4,403,861 (Boisde et al) discloses a photometric instrument with an optical switch. A mechanical device is formed as a cylindrical member with transverse channels and internal reflective surfaces, or optical fibers functioning similarly, for channeling light to selected locations. The cylinder is rotated to select the destination.

SUMMARY OF THE INVENTION

An object of the invention is to provide a novel optical switching device for interrupting a light transmission or for switching among a plurality of optical transmission lines such as optical fibers. Another object is to provide an optical switching device for directing a light beam between a first transmission means and a selected one of a plurality of second transmission means, without interceding conversion between optical and electronic transmission. A further object is to provide an optical switching device for directing a pair of light beams between a primary pair of transmission means and a selected pair from a plurality of secondary pairs of transmission means.

The foregoing and other objects are achieved by an optical switching device comprising a first transmission means terminating in a first window, for transmitting a light beam, and a plurality of second transmission means each terminating in a corresponding second window, for selectively further transmitting the light beam. The transmission means advantageously are optical fibers arranged in a bundle with the windows lying in a window plane. An imaging means such as a concave mirror is selectively positionable with conjugate foci located respectively at the first window and selectively at any one of the second windows so as to reciprocally image the first window and a selected second window on each other. The imaging means is rotated about a rotation axis different than the optical axis of the mirror, so as to rotate the mirror among a plurality of arcuately spaced selected positions. Preferably the rotation axis is parallel to and spaced from the optical axis. In each selected position, the imaging means closes a light circuit between the first transmission means and a selected second transmission means.

In an advantageous embodiment the first transmission means comprises a central optical fiber, and the plurality of second transmission means comprises a plurality of second optical fibers surrounding the central optical fiber. Preferably the optical fibers have a common fiber diameter and are close packed with the plurality of second optical fibers being six in number.

In a further embodiment an optical switching device comprises a primary pair and a plurality of secondary pairs of transmission means. The primary pair consists of a first transmission means terminating in a first window and a third transmission means terminating in a third window, each of said means being for transmitting a separate light beam. Each secondary pair consists of a second transmission means terminating in a second window and a fourth transmission means terminating in a fourth window, each of the second and fourth transmission means being for selectively transmitting a separate light beam. An imaging means with an optical axis is selectively positionable cooperatively with placement of the windows, the imaging means having two simultaneously active sets of conjugate foci. Conjugate foci of a first set are positionable respectively at the first window and at the second window of a selected secondary pair so as to reciprocally image the first window and the second window on each other. Conjugate foci of a second set are simultaneously locatable at the third window and at the fourth window of the selected secondary pair so as to reciprocally image the third window and the fourth window on each other. The imaging means is rotatable about a rotation axis different than the optical axis, so as to rotate the imaging means among a plurality of arcuately spaced selected positions, such that in each selected position the imaging means closes a first light circuit between the first transmission means and a second transmission means of a selected secondary pair, and simultaneously closes a second light circuit between the third transmission means and a corresponding fourth transmission means of the selected secondary pair.

BRIEF DESCRIPTION OF THE DRAWINGS

FIG. 1 is a perspective schematic drawing of an embodiment of the invention.

FIG. 2 is an end view of a closed packed bundle of optical fibers according to a further embodiment of the invention.

FIG. 3 is a longitudinal section of a device for carrying out the

DETAILED DESCRIPTION OF THE INVENTION

Figure 3:
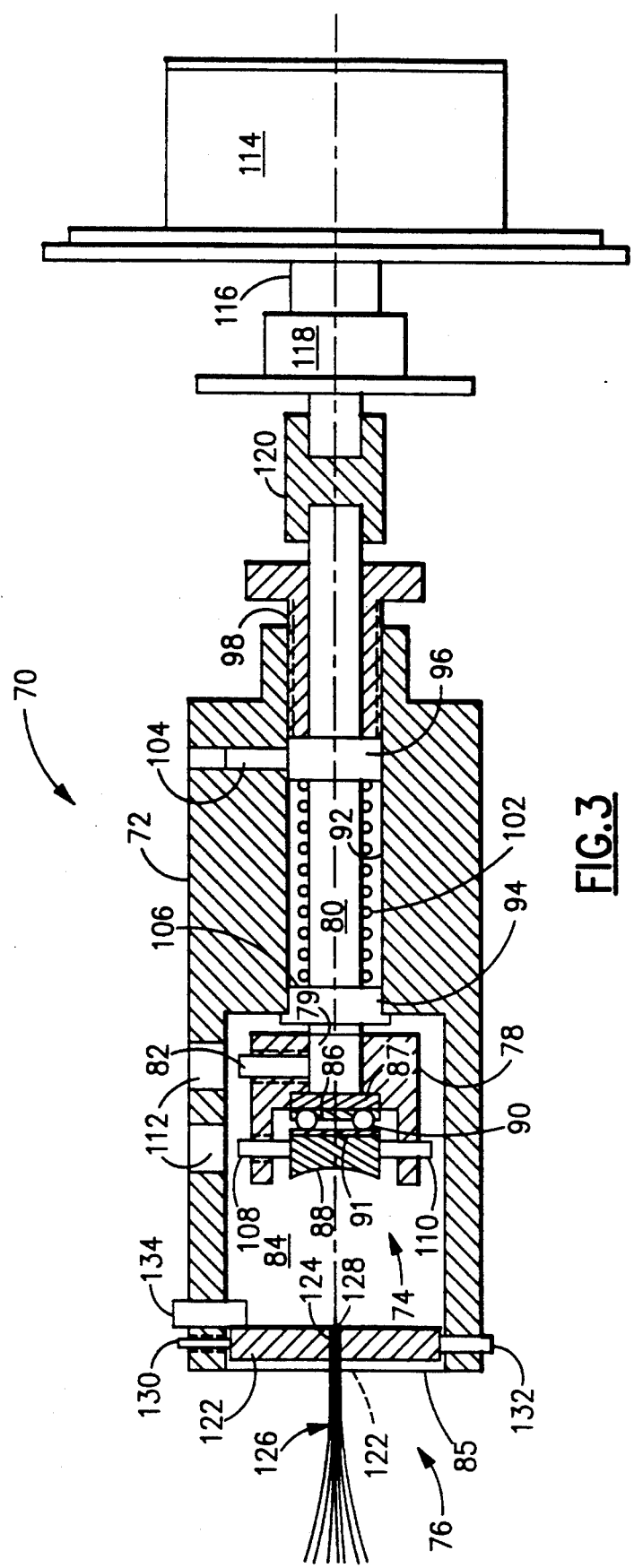

FIG. 1 illustrates the principle of the invention in a simple embodiment. A bundle of optical fibers 12 is formed in a close packing of seven fibers, specifically a central fiber 14 and six adjacently surrounding fibers 16. For clarity the latter are shown separated from the central fiber, and may even be utilized in such separation or without close packing, but contact in a close packed configuration is generally most convenient and efficient. (The terms "close packing" and "close packed" are used herein in the conventional sense of an array of equal diameter fibers arranged with a maximum density and six-fold symmetry.) The fibers terminate with corresponding windows 18, so that each fiber may transmit a light beam along its length and through its window. The windows preferably lie in a plane 20, herein designated "window plane".

Spaced axially from the bundle 12 and the window plane 20 is a concave mirror 22 which functions as an imaging means. The mirror is displaceable, preferably by being mounted on an axle 24 so as to allow rotation 25 of the mirror about a rotation axis 26. According to the invention the rotation axis 26 is different than the optical axis 28 of the mirror 22. In the present example, and generally preferably, the rotation axis 26 is parallel to and spaced from the optical axis 28 by a certain displacement D which depends on the configuration of the optical fibers 12. In the case of seven fibers with a common fiber diameter and close packed, the displacement is half of the diameter F of the fibers, but greater for the separated fibers shown.

Also the rotation axis 26 in this example is centered axially through the window of the central fiber 14, so that the locus 32 of the optical axis during rotation of the mirror is on the outer perimeter of the central fiber. (In the case of the fibers being separated as in the figure, the locus is half way between the central fiber and the surrounding fibers.) The mirror 22 is spaced from the window plane 20 so that the center of curvature 34 of the mirror is on the locus 32. The mirror has six selectable arcuate positions about the rotation axis such that one conjugate focal point of the mirror is always on the central window 36, and a corresponding conjugate focal point is selectively on any one of the outer windows, e.g. selected window 38 in FIG. 1.

An input light beam 40 from a light source (not shown) is transmitted through the central fiber 14 to and through the window 36 therein, the central fiber being designated herein as a first transmission means and its window a first window for the beam. The beam is imaged by the mirror 22 to the selected outer window 38 of a corresponding fiber 42 which, in turn, transmits the output beam 44 to a destination (not shown). Thus in each selected position the mirror closes a light circuit between a first optical fiber and a second optical fiber selected from a plurality of fibers. Switching among selected transmission means is thereby effected. In the example of FIG. 1 the central fiber transmits an input light beam and the outer fibers transmit an output beam; this direction may, of course, be reversed.

Other embodiments may readily be appreciated. For example, in a simpler aspect of the invention, there may be only two fibers arranged with their windows at the conjugate foci for a particular position of the mirror. In this case a small rotation of the mirror opens the optical path, and the arrangement is simply an on-off or interrupt switch. In other cases 2,3,4, or 5 outer fibers may be utilized.

In further aspects of the invention other forms of transmission means may replace the optical fibers. For example an optical train of lenses and/or mirrors may focus a beam to one window location for switching by the mirror, and a similar train may receive and transmit the switched beam from another window location. Also the imaging means may be a lens or lens system, in which case the input fiber or train is on one side of the lens, and the output fibers or trains are on the other side. The exit and entrance windows are correspondingly at conjugate foci of the lens. In an another alternative, the imaging means may consist of a plane mirror and a lens in a combination essentially equivalent to a concave mirror.

In another embodiment the basic arrangement is similar to that shown in FIG. 1 but a larger number of transmitting fibers is utilized so that two separate optical transmissions may be switched simultaneously. These are useful for optical apparatus such as a photospectrometer which has both an input optical circuit and an output optical circuit, each to be switched separately but simultaneously. The window plane of a suitable close packed bundle of 24 fibers 52 is shown in FIG. 2. The active fibers in this bundle are designated with an "I" for the input circuit and an "O" for the output circuit.

The rotation axis (perpendicular to the plane of FIG. 2) passes through the geometric center 54 of the bundle, the center being at the point line of contact of the two central fiber windows 55. These central fibers constitute a primary pair of transmission means. The first fiber of the pair is designated an I fiber and the other is an O fiber; for descriptive convenience the I fiber is also designated as a first fiber and the O fiber of the pair is designated as a third fiber, there being corresponding first and third windows, and these are shown in the figure as $I_1$ and $O_3$.

The others in the group of active fibers in the bundle constitute a plurality of secondary pairs of transmission means, there being six such pairs of adjacent fibers in the plurality of this example. Each secondary pair consists of an I-type second transmission means terminating in a second window and a corresponding O-type fourth transmission means terminating in a fourth window, shown as $I_2$ and $O_4$. The inactive fibers 56 in the bundle (with no I or O designation) are distributed as spacers to properly locate the active fibers in the bundle. It may be seen from FIG. 2 that the active fibers 58 form alternating close packed planes of fibers. A central plane contains the primary pair, and two planes of active fibers are separated from the primary plane by planes of inactive fibers.

In this embodiment the optical axis (also perpendicular to the plane of FIG. 2) of the mirror is offset from the rotation axis by one diameter of the optical fibers in the same manner as in FIG. 1, so that the locus 60 of the optical axis, upon rotation of the mirror, passes through a circle of such diameter. With this arrangement the mirror (not shown in FIG. 2) is selectively positionable cooperatively with placements of the windows so that there are two simultaneously active sets of conjugate foci. The conjugate foci of the first set ("I") are positionable respectively at the first window and a second window of a selected secondary pair, e.g. pair 62, so as to reciprocally image the first window $I_1$ and the second window $I_2$ on each other. The conjugate foci of the second set ("O") are simultaneously locatable at the third window and the fourth window of the same selected secondary pair so as to reciprocally image the third window $O_3$ and the fourth window $O_4$ on each other.

Thus one focus of each set of conjugate foci is always on a corresponding I or O fiber window of the primary (central) pair 55, and the other is on a corresponding I or O window of a secondary pair, e.g. 62, selected by rotation of the mirror. The result is that in each selected position the imaging means closes a first light circuit between the first transmission means and a second transmission means of a selected secondary pair, and simultaneously closes a second light circuit between the third transmission means and a fourth transmission means of the selected secondary pair.

FIG. 3 depicts a suitable optical switching device 70 for carrying out the invention. A housing 72 holds a mirror assembly 74 and a fiber optic assembly 76. The mirror assembly includes a mirror cup 78 held in place at the inner end 79 of an axle shaft 80 with a set screw 82, with the cup disposed in a cylindrical chamber 84 in the housing that opens to one end 85 of the housing. A backing plate 86 made of magnetically permeable material, e.g. Alnico (TM), is attached coaxially to an end plate 87 of the shaft in the cup. A concave mirror 88 formed of glass bonded to a backing disk 91 of cold rolled steel is held in place magnetically to the backing plate, spaced therefrom by three equally spaced steel balls 90 (two shown).

The shaft passes through a bore 92 extending concentrically from the chamber 84 and exiting the other end of the housing. The shaft is slidingly centered in a first ball bearing 94 affixed in the bore adjacent the chamber. The shaft is affixed to a second ball bearing 96 near the exit of the bore from the housing, the second bearing being disposed slidingly in the bore. A tubular screw 98 disposed over the shaft and threaded into the bore 92 at the exit contacts the second bearing 96 to locate that bearing longitudinally. A spring 102 encircles the shaft 80 in compression between the bearings 94,96 to position the second bearing 96 against the tubular screw 98 and prevent longitudinal play of the shaft 80 and the mirror assembly 74.

Adjustment of the screw 98 accurately positions the shaft 80, and thereby the mirror 88 longitudinally. A pair of orthogonal spring loaded vliers 104 (one shown) on bearing 96 prevent lateral play of the shaft at this bearing. A snug Teflon TM collet 106 on the shaft at the first bearing 94 prevents lateral play of the shaft near the mirror.

A pair of orthogonal offset screws 108 and opposing vliers 110 (one each shown) are threaded through the sidewall of the cup to contact and position the mirror laterally in the cup. Holes 112 in the housing wall are alignable with the offset screws 108,82 so the screws can be reached by screwdriver for adjustment.

The housing 72 is mounted on a base plate or the like (not shown), as is a stepper motor 114 with a drive shaft 116 and opto-interrupt disk 118 aligned with the mirror shaft 80. An Oldham or other zero backlash coupling 120 connects the shafts so the motor can rotate the mirror 88 to selected orientations.

The fiber optic assembly 76 comprises a support member 122 with an axial aperture 124 for holding the ends of a bundle of the desired plurality of optical fibers 126 with their corresponding end windows 128 aligned in a plane. The disk is positioned axially at the open end 85 of the cylindrical chamber against three pins 134 (one shown) in the housing wall. The disk 122 is centered laterally with the aid of pairs of orthogonal centering screws 130 and vliers 132 (one set shown).

For initial alignment the fiber optic assembly 76 is replaced with a transparent plastic alignment target dimensioned the same as the support member 122, and having a small center spot. With screws 108 and the help of a simple stereo microscope, the center spot and its image from the mirror are made to coincide for all stations of the shaft. At this point all components are on axis. The mirror is then displaced off-axis by the proper amount by rotating one of the offset screws 108 a calibrated fraction of a turn. Fine adjustments may be made with the optic assembly in place by noting light intensities through the fibers. After alignment the device is used as described for FIG. 1 and/or FIG. 2.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. An optical switching device comprising:
    a primary pair of transmitters consisting of a first transmission means and a third transmission means, the first transmission means terminating in a first window and the third transmission means terminating in a third window, the first and third transmission means each being for transmitting a separate light beam;
    a plurality of secondary pairs of transmitters, each secondary pair consisting of a second transmission means and a corresponding fourth transmission means, the second transmission means terminating in a second window and the fourth transmission means terminating in a fourth window, the second and fourth transmission means each being selectively transmitting a separate light beam;
    a single imaging means having an optical axis and being disposed to effect two simultaneously active sets of conjugate foci, the sets consisting of a first active set and a second active set; and
    rotating means for rotating the imaging means about a rotation axis different than the optical axis, so as to rotate the imaging means among a plurality of arcuately spaced selected positions, the selected positions being cooperative with placement of the windows so that, simultaneously for each selected position:
    (a) the conjugate foci of the first active set are postionable so as to reciprocally image the first window and a selected second window on each other, and
    (b) the conjugate foci of a second active set are positionable so as to reciprocally image the third window and a correspondingly selected fourth window on each other;
    whereby in each selected position in the imaging means closes a first light circuit between the first transmission means and the second transmission means of a selected secondary pair, and simultaneously closes a second light circuit between the third transmission means and the corresponding fourth transmission means of the selected secondary pair.

2. The device according to claim 1 wherein each transmission means comprises one of a group of active optical fibers each terminating at an associated window.

3. The device according to claim 2 wherein the imaging means is a reflective imaging means.

4. The device according to claim 3 wherein the active optical fibers all have a common fiber diameter and are arranged in a bundle with the windows lying substantially in a window plane.

5. The device according to claim 4 further comprising inactive optical fibers having the fiber diameter such that the total of the active optical fibers and the inactive optical fibers are at least 24 in number and are arranged in close packed configuration in the bundle, wherein two adjacent optical fibers centrally located in the bundle constitute the primary pair, the rotation axis intersects the window plane centrally between the optical fibers of the primary pair, and the optical axis is parallel to and spaced from the rotation axis by a displacement equal to the fiber diameter, whereby each of the secondary pairs each consists of two adjacent optical fibers in the bundle.

6. The device according to claim 3 wherein the imaging means is a concave mirror.

* * * * *

UNITED STATES PATENT OFFICE
CERTIFICATE OF CORRECTION

Patent No. 5,056,886  Dated October 15, 1991

Inventor(s) Robert A. Hoult

It is certified that error appears in the above-identified patent and that said Letters Patent is hereby corrected as shown below:

In column 1, line 18, before "involves" insert --optical transmission. U.S. patent No. 4,594,002 (McNally)--.

In column 2, line 44, after "out the" insert --invention--.

Signed and Sealed this

Eleventh Day of May, 1993

Attest:

MICHAEL K. KIRK

Attesting Officer   Acting Commissioner of Patents and Trademarks